United States Patent
Maier, Jr.

(10) Patent No.: US 6,571,731 B1
(45) Date of Patent: Jun. 3, 2003

(54) APPARATUS FOR AUTOMATIC SELECTING OUT OF MILK

(76) Inventor: Jakob Maier, Jr., Griesstrasse 4, D-86842 Tuerkheim (DE)

(*) Notice: Subject to any disclaimer, the term of this patent is extended or adjusted under 35 U.S.C. 154(b) by 0 days.

(21) Appl. No.: 10/031,865
(22) PCT Filed: May 11, 2000
(86) PCT No.: PCT/EP00/04280
§ 371 (c)(1), (2), (4) Date: Jun. 3, 2002
(87) PCT Pub. No.: WO00/67559
PCT Pub. Date: Nov. 16, 2000

(30) Foreign Application Priority Data
May 11, 1999 (DE) .......................... 199 21 777

(51) Int. Cl.$^7$ .................................. A01J 3/00
(52) U.S. Cl. .................................. 119/14.08
(58) Field of Search .................. 119/14.08, 14.14, 119/14.18, 14.32, 14.33

(56) References Cited

U.S. PATENT DOCUMENTS

| | | | |
|---|---|---|---|
| 4,188,910 A | * | 2/1980 | Hocker .................. 119/14.08 |
| 4,190,020 A | * | 2/1980 | Tamas et al. ............ 119/14.08 |
| 4,440,110 A | * | 4/1984 | Hicks ..................... 119/14.08 |
| 5,873,323 A | * | 2/1999 | van den Berg et al. ... 119/14.08 |
| 6,073,580 A | * | 6/2000 | Graupner et al. ........ 119/14.08 |
| 6,378,455 B1 | * | 4/2002 | Postma et al. ........... 119/14.08 |

FOREIGN PATENT DOCUMENTS

WO    WO 00/35270    *  6/2000   ............ 119/14.08

* cited by examiner

Primary Examiner—Charles T. Jordan
Assistant Examiner—Elizabeth Shaw
(74) Attorney, Agent, or Firm—Flynn, Thiel, Boutell & Tanis, P.C.

(57) ABSTRACT

An automatic milking machine for the determination of quality of milk during the milking process comprises a distributing valve mechanism with a milk inlet and several milk outlets, a measurement apparatus, and a driving element, whereby the measurement apparatus has a detection means for automatically detecting particles in the milk stream. The driving element drives the distributing valves mechanism, depending on the amount of particles determined to be in the milk, so that milk of diminished quality is selected out.

33 Claims, 3 Drawing Sheets

APPARATUS FOR AUTOMATIC SELECTING OUT OF MILK

FIELD OF THE INVENTION

The present invention relates to an apparatus for the automatic selecting out of milk during machine milking comprising a measuring apparatus for the control of the quality of the supplied milk a distributing valve mechanism with a milk input and several milk outputs, as well as a seal mechanism for the optional dosing of the milk outputs and for the optional guiding of the stream of milk into one of several lines, and a control device that actuates the distributing valve mechanism for selecting out milk,

DESCRIPTION OF THE PRIOR ART

As is known, during machine milking milk from a large number of animals ends up in a collection tank. Thereby, the yielded milk quality can be heavily spoiled by the milk of diseased animals, especially those with a just beginning and not yet diagnosed illness. To insure a high milk quality it is therefore requisite to carry out a monitoring of the milk during the milking process and, at the recognition of milk of unacceptable quality, to select out the milk before it ends up in the collection tank.

In particular, raw milk may not, in accordance with §3 of the milk ordinance, show any "abnormal sensory characteristics." Assessing of the quality of the milk for changes during the automatic milking process is already possible in known apparatuses. Apparatuses of the kind described in the introduction are known that make use of the fact that the ion content in the milk of ill animals differs from that in the milk of healthy animals. In this way, the conductivity of the milk serves as a parameter by which a selecting out of the milk of insufficient quality can be carried out.

An apparatus of this type is disclosed in DE 196 30 146. In the milking apparatus described therein, a measurement chamber including a sensor element for the detection of the conductivity and temperature of the milk is disposed in the valve housing, wherein the measurement chamber is in fluid communication with the housing interior by at least one opening. This arrangement allows, in particular, a dependable recognition of mastitis diseases in the milked cows. To fulfill the legal requirements. It would be desirable to be able to recognize even more sources of registerable changes in the milk and to correspondingly control a selecting out of the milk.

SUMMARY OF THE INVENTION

It is therefore the object of the present invention to provide a new apparatus and a new method for the automatic selecting out of milk of the type mentioned in the introduction that, in comparison to traditional apparatuses and methods of this type, more reliably meet the requirements for milk dictated by quality concerns, especially the monitoring of the abnormal sensory characteristics.

This object is solved in an inventive manner with an apparatus like that described in the introduction for the automatic selecting out of milk, wherein the measuring system comprises a detection means for the automatic detection of particles in the milk stream.

Through the particle detection, it is possible to determine if there are particles present in the milk stream that either have formed due to changes caused by infection or that have gotten into the milk stream due to the contamination of the udder or milking machine. The particles of the first type are, in particular, suppurating particles that can appear with a size from 0.5 to 3 mm. Especially in the case of illnesses which result in a formation of pus in the area of the udder, pus particles occur in the milk that, in accordance with the present invention, will now also be detectable during machine milking.

In a preferred embodiment the detection means comprises a signal transmitter for the transmitting of signals and a signal receiver for the receiving of signals. The transmission of appropriate signals, which are affected in differing ways by the milk and by the particles contained therein, allows a detection of particles that can be substantially carried out without disturbing the milk flow. To this end, advantageously an optical signal transmitter and receiver as well as a transmitter and receiver operating in the range of microwaves are may be used.

In a further advantageous embodiment of the present invention, the detection means comprises an electronic analyzing circuit that receives data from the signal receiver. The analyzing circuit is thereby preferably provided as a microcontroller that can exchange data with the signal transmitter and receiver via, for example, electrical wires or also over a wireless connection. When the signal transmitter and receiver are provided as current and voltage sources or as sensors, these can also be integrated into the microcontroller. For the analyzing circuit, therefore, a very compact, interference-free and robust structure may be realized.

In a preferred embodiment the detection means comprises an area-like flat filter element for the filtering out of particles from the milk stream. This filter element extracts particles exceeding a predefined size from the milk stream, whereby these are then, independent of the milk stream, accessible for measurement.

In a further advantageous embodiment, the detection means comprises an apparatus for the cleaning of the filter element. It is thereby possible to carry out quantitative measurements during the entire milking process, since constant measurement conditions can be maintained on the filter element during the entire milking process in which the particles are continuously removed from the filter element in this way, it is possible to correspondingly select out milk during the different stages of the milking process in which the quality of the milk can vary entirely.

In yet another preferable form of this embodiment, the filter element is rotated around an axis. In particular when the filter element is, for example, provided as a grid or as a filter with only longitudinal elements, it is effective to rotate the filter element in order to carry out a washing of the particles from the grid surface by means of the milk stream. Thereby, the filter element can be so positioned such that particles that are caught on one surface of the grid are flowed against from behind, while the particle free surface of the grid selects out particles from the milk stream. A nearly parallel flow of the milk stream with respect to the grid surface is possible as well.

Preferably the detection means comprises an actuation element for the rotation of the filter element. The cleaning of the filter element can be carried out therewith prior to each measurement process, independent of the degree of contamination, whereby the microcontroller takes over the driving of the actuation element as is appropriate.

In a further preferred embodiment, the filter element comprises electrically conductive elements that are arranged at a distance and isolated from one another. When current or voltage is introduced into this element, the amount of particles present on the filter surface can be detected in an easy manner, since changes occur in the relationships between the resistances in the filter element as a consequence of the deposited particles.

Advantageously, the conductivity of the elements is dependent on the length of the elements. It is thereby possible to receive information about the particle sizes.

In a further preferred embodiment, the filter element comprises an area in which the conductive elements each have a first distance from one another and a further area in which the conductive elements each have a second distance from one another. Thereby, it is possible to select particles according to size in order to, for example, extract information about the type of illness of the animal.

In a further advantageous embodiment of the intention in which a filter element is provided, the detection means comprises a radiation source for the transmitting of electromagnetic radiation in the direction of the filter element and a radiation sensitive sensor element for the receiving of the transmitted radiation from the direction of the filter element. With this arrangement, the structure of the filter element is kept simple, as no electrical feed lines are necessary. The radiation source and the radiation sensitive sensor element are thereby so arranged so that the radiation sensitive sensor element receives the radiation once an interaction with a surface of the filter element has taken place.

In particular, the particle detection is attained by measuring the loss of intensity during the passing of radiation through the filter element, i.e., during the transmission. Preferably, the filter element will be rotated to a suitable position for this measurement, for example, when the filter element is in any case brought into the "cleaning position", wherein the measurement may take place during the rotation.

In a further advantageous embodiment, the filter element includes a reflecting area. Through the measurement of the reflected intensity, it is possible to determine the amount of the deposited particles in an easy way.

In a further advantageous embodiment, the radiation source is formed so as to emit substantially monochromatic radiation. For the emitted radiation, advantageously a wavelength is chosen by which the particles to be detected in the milk behave in a significantly different way compared to the interaction of radiation in the milk, so that a clearly measurable effect ensues. Appropriately, the radiation source may emit in several selectable wavelengths.

In a further preferred embodiment, the radiation source is so arranged that during a measurement phase it transmits radiation substantially parallel to the filter surface. The detection of particles exceeding a predefined extent can, through the appropriate selection of the distance of the radiation source and the receiver from the filter surface, be achieved. For example, only particles exceeding a certain size interrupt light from laser diodes running parallel to the filter surface and, depending on the distance of the beams from the filter surface, the contact to the receiver.

In a further preferred embodiment the signal transmitter is an ultrasound transmitter. This allows the simple detection of particles directly in the milk stream, without strongly influencing the flow conditions of the milk.

Advantageously the ultrasound transmitter and the signal receiver are spatially arranged so that contact with the fluid during operation is possible. This has the effect that the transmittal and detection are not significantly impaired by the operating vacuum. Furthermore, the construction can, in a simple manner, be thereby combined in this way with the apparatus previously described for the measurement of the conductivity of the milk, in that the measurement chamber described above can be supplemented with an ultrasound transmitter and an ultrasound receiver.

In a further preferred embodiment the detection means composes an oscillating balance with a plezo element and an oscillating circuit Through this arrangement, the changes in the weight of the filter element can be very precisely determined, whereby accurate quantitative information about the amount of deposited particles can be yielded.

Further advantageous embodiments are explained in the claims as attached below.

BRIEF DESCRIPTION OF THE DRAWINGS

In the following, the invention will be more precisely explained and described with respect to the examples of embodiments described herein and with respect to the figures which have been drafted in accordance with these embodiments. It is shown.

DETAILED DESCRIPTION OF THE INVENTION

In general, an automatic milking machine (not shown in the figures) comprises four milk cups that are coupled, via short milk hoses, with a collection and multipath distributing valve mechanism. The multipath distributing valve mechanism has, next to its four input openings, two output openings that can be optionally opened and closed. On one of the output openings a milk hose is connected which leads to a collection tank. The other port is connected to a milk selection line. On both of the lines, a vacuum or an underpressure of approximately 40–50 kPa can be applied during operation, and is also applied to the milk cups, serving to suck out tire milk from the teats.

The milk cups are lined on their interior sides with so-called teat rubbers, which are composed of a soft material and which come into direct contact with the teats of the cow during the operation of the milking apparatus. During the suction phase, the milk stream flows from the teat rubbers via a connecting line (short milk hose) to the distributing valve mechanism in which the milk is distributed to different lines by the automatic actuation of the valve. The distribution of the milk into the selecting line is, among other reasons, therefore necessary because lawmakers have prescribed a selecting out of milk that does not fulfill the specific requirements as set forth in the milk ordinance.

From the distributing valve mechanism, the milk reaches the collection tank via the so-called long milk hose. The milk is sucked out in a pulsed manner about 60 times per minute.

While the operating vacuum is permanently attached to the milk collection lines and screening lines, the vacuum and the ambient pressure are alternately applied in a pulsed manner to the milk cup which is made of a rigid material and in which the teat rubber is arranged so as to be vacuum-sealed. As soon as a vacuum prevails in the interior of the milking cup, the teat rubber extends itself, due to its inherent elasticity, and allows a milk throughflow to the short milk hose and to the suction line. When atmospheric pressure prevails in the interior of the milk cup, the elastic teat rubber, inside of which lies the vacuum from the milk suction line, and in which the other end is dosed during flow by the teat, is pressed together so that no milk can flow through. Due to the pulsed operation, a massage effect of the teat is achieved that is necessary for maintaining the health of the teats and of the animals.

The inventive detection means can, in principle, be installed at any preferred point in the milk stream, however one will choose an appropriate point where the electrical or pneumatic connection lines are not within treading range of the animal.

Further, it should be emphasized that the inventive detection means is so formed that it is operable during the entire milking process as well as only during certain phases of the milking process, for example during preliminary milking.

Figure 1A:
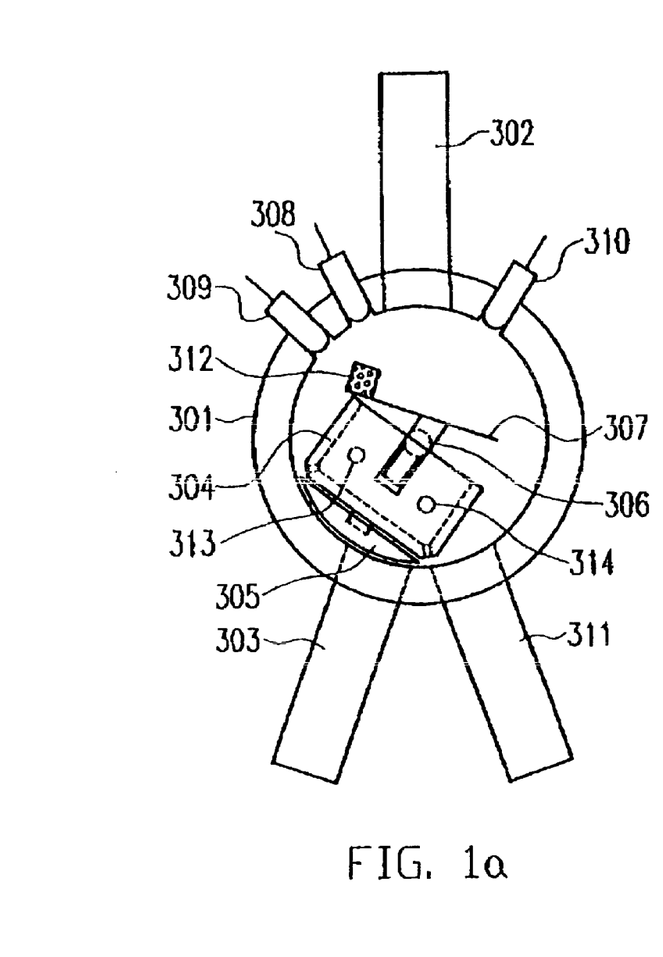
FIGS. 1a and 1b a schematic cross-section of a first embodiment of the detection means in accordance with the present invention, FIG. 2 a schematic cross-section of a second embodiment of the detection means in accordance with the present invention, FIG. 3 a schematic cross-section of a detection means along the section III—III as shown in FIG. 2, FIG. 4 a top view of an example of a filter element in accordance with the present invention FIG. 5 a schematic cross-section of a further embodiment of the detection means with optical signal transmitter and receiver, and FIG. 6 a schematic cross-section of a further embodiment of the detection means of the present invention.
Figure 1B:
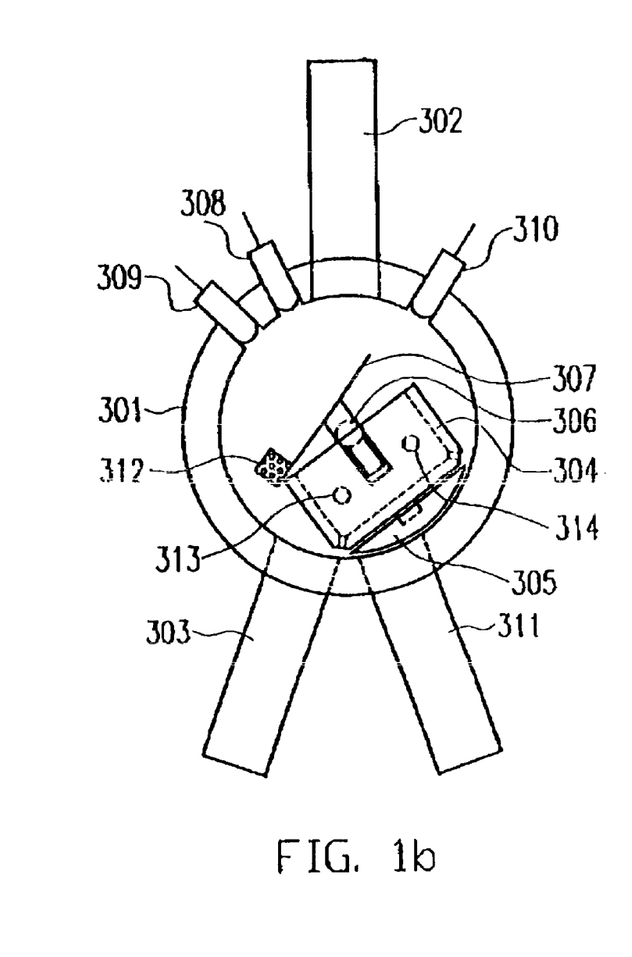

FIGS. 1a and 1b schematically show, for example, one embodiment in which an inventive particle detection means together with a measurement chamber, like that described in DE 196 30 146, is positioned in the distributing valve mechanism.

FIG. 1a shows a distributing valve mechanism 301 with a milk inlet 302, and a milk outlet 303 that takes in the acceptable milk and a milk outlet 311 that takes in the milk to be selected out A measurement chamber 304 is mechanically coupled with a slider 305. The measurement chamber 304 and the slider 305 are mounted on a rotating axis 306. The axis 306 is connected to a step motor (not shown). A filter element 307 is mounted on the measurement chamber 304. The filter element 307 is provided as a thin metal plate with a reflective surface that has sieve-like drill holes with an average diameter of 0.5 mm. On one lateral edge of the filter element, and on the bordering end areas of the edges abutting this lateral edge, an approximately 3 mm high border 312 is formed, the surface of which also has a filter structure. There are drill holes in the wall of the distributing valve mechanism 301, in each of which an LED 308, a photodiode 309 and a further photodiode 310 are evenly fitted to the finer surface of the distributing valve mechanism in a vacuum-sealed manner. In the measurement chamber 304, electrodes 313 and 314 that are intended for the conductivity measurement of the milk are isolated from each other.

FIG. 1a shows the distributing valve mechanism 301 in operational mode at the beginning of the milking process when the slider 305 completely closes off the milk outlet 303. In the suction phase, in which the milk is diverted out of the teat the milk stream strikes the filter element 307, on the surface of which, depending on the quality of the milk, particles are deposited. After running the suction phase, the controller (not shown) of the detection means switches the LED 308 on and subsequently evaluates the signal from the photodiode 310 that is yielded from the light reflected on the filter element 307. When the result of the evaluation shows an acceptable quality of the milk (low quantity of particles), the controller drives the distributing valve mechanism in such a way that this assumes the operating position as shown in FIG. 1b. The milk outlet 303 is then opened and milk is guided into the line intended for the fault-free milk. In this position, the surface of the filter element 307 is flowed against in a relatively slanted manner so that a part of the existing particles from the preceding suction phase will be "washed out" and collect on the periphery border area. After each suction phase ends, a signal from the photodiode 309 is evaluated. When a certain threshold value is exceeded, thus pointing to the fact that the particle quantity in the milk has increased, the distributing valve mechanism is instructed to again take on the initial position in which the milk will be selected out and an exact measurement of the particles is possible, since, in this position, substantially all particles are deposited on the surface.

Further embodiments of the present invention shall now be described with reference to FIGS. 2, 3 and 4.

Figure 2:
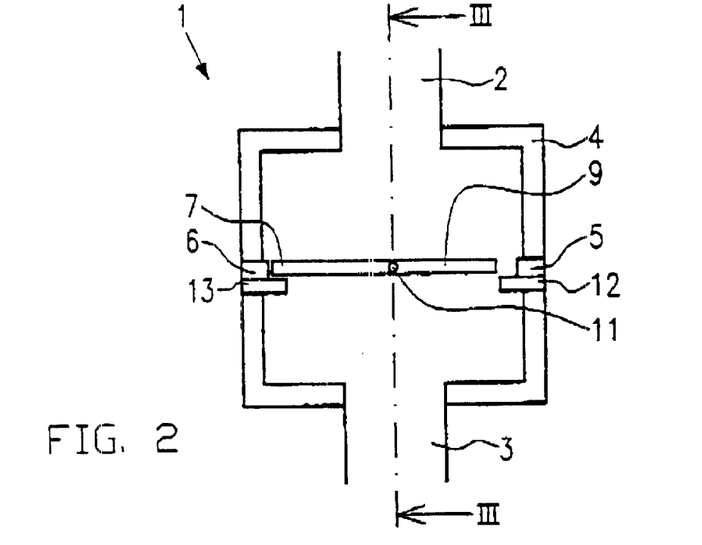

In FIG. 2 a lateral cross-section of a measurement chamber of an inventive detection means is shown. The measurement chamber 1 shows an inlet 2 and an outlet 3. The measurement chamber is intended for placement between the milk cup and the distributing valve mechanism in the milk line. A wall 4 of the measurement chamber has, on each of its diametrically opposed sides, a mounting 5 or a mounting 6. An edge area 7 of the filter element 9 lies on the mounting 6. Filter element 9 is rigidly connected to a rotatable axis 11. The axis 11 lies at the center of the diameter of the inlet 2. Vacuum-sealed cable feeds 12 and 13 having electrical lines each lead to the mountings 5 and 6. The surfaces of the mountings 5 and 6 each has electrically conductive areas that allow for an electrical connection with the cables from the feeds 12 and 13 outside of the detection means.

Figure 3:
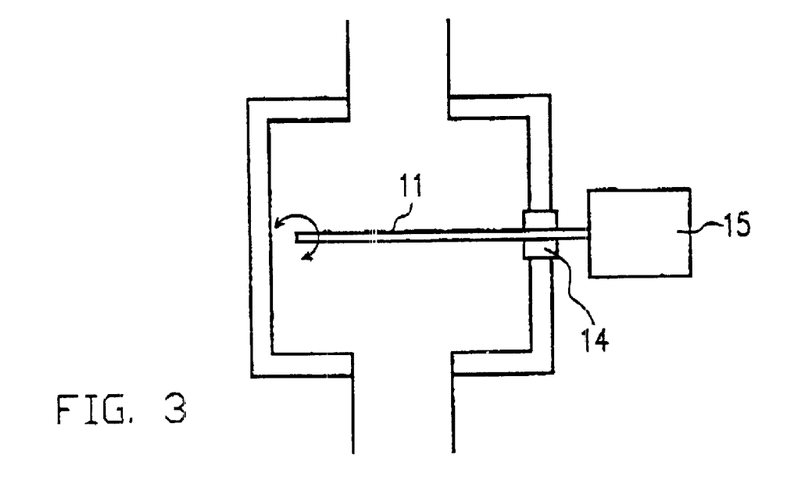

FIG. 3 shows the measurement chamber 1 along the section III—III from FIG. 2. Axis 11 is supported by means of the vacuum-sealed bearing 14 in the wall 4 and coupled mechanically with a driving element 15. In the pictured embodiment the driving element is an electrical motor from which a controller is driven by means of a driver (both not shown). Naturally, other types of driving elements are also possible. In this way, for example, the actuation could ensue pneumatically.

Figure 4:
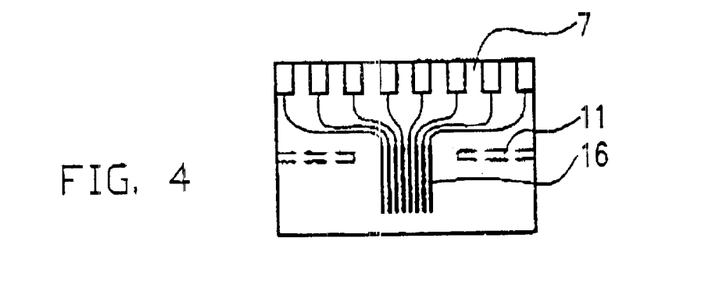

FIG. 4 shows an exemplary embodiment of the filter element 9. The periphery 7 of the filter surface has electrical contact surfaces, each of which is electrically conductive and connected with electrically conductive elements 16 that are formed in an oblong way with defined distances from one another. The elements 16 are completely electrically conductive or possess at least surface areas that are able to conduct electricity. As shown in FIG. 4, the electrical contact surfaces are wide so as to guarantee a reliable contact with the correspondingly formed contact surfaces on the mountings 5 and 6. The elements 16, which form the filter areas of the filter element 9 that are actually active, can, for example, be made of metal rods that maintain a predefined distance from one another due to their inherent stability. In FIG. 4 a parallel arrangement of the elements is shown, but other geometric configurations of the elements are also possible.

There is also the possibility to coat the surfaces of the isolators with a conductive coating. For example, a filter element of chemically passive plastic could be produced which has a desired filter structure, for example a grid structure, and which is given a final coating of aluminum or silver to give it a correspondingly desired structure (for instance only parallel grid spacing). A back side can also be coated so that in this variation, as well, two active filter surfaces are available for use. Further, it is also possible to use wires made of a suitable material and spanned across a frame, for example in the form of resistance wires, as an active filter surface. The distance of the elements in the active filter surface can be varyingly chosen so that areas result which can filter out particles exceeding a different minimum size. In the shown embodiment, the axis 11 is, furthermore, not continuously realized so as not to influence the active filter area of the filter element 9.

During the operation of the milking device, milk ends up in the measurement chamber 1 of the detection means via the inlet 2 during a suction phase and subsequently flows against the filter element 9, whereby particles are filtered out on the surface facing the milk stream. In the subsequent relief phase, when no more milk is present, the controller (not shown), which is connected to the mountings 5 and 6 via the lines in the feeds 12 and 13, determines the changes in resistance of the neighboring elements. Through the deposition of milk particles on the filter surface, electrical contacts are formed between two neighboring elements, the resistance of witch depend on the quantity, size, as well as type of particle. From the derived resistance values, the controller can determine threshold values for driving the distributing valse mechanism by means of an appropriate algorithms. After the measurement and before the next suction phase, the controller sends an impulse to the driving element 15 that, in reaction to this signal, rotates the filter element about 180° so that the periphery of the filter element 9 lies on the mounting 5. At the start of the next suction phase, the top side of the filter element is flowed against by the milk and it filters out the particles. At the same time, particles trapped on the bottom side of the filter element are washed away by the stream of milk. During the subsequent relief phase, the controller again carries out the determination of the resistance values in the manner as described above and sends a further signal to the driving element, which then rotates the filter element 9 back to its original position.

The above-mentioned "back-splash" cleaning of the filter surface may also be carried out by means of additional apparatuses. In this way, in one arrangement a part of the milk stream could be stored in a reservoir and used after the measurement, and then, by means of an injection nozzle and air pressure, streamed against the back side of the filter, so that the filter element itself does not have to be moved.

The formation of the filter element in the just described embodiment is to be understood only as one example. Further, the electrical configuration can be changed, for example, with alternating currents being used in order to measure the inductivity, capacitance, etc. In addition, it is advantageous to carry out, as often as possible, reference measurements of the milking process so as to be able to take into account the changes in measurement conditions (wetting of the contact surfaces, resistance changes due to particles not washed away, etc.). Furthermore, the accuracy of the determination of the particles can be increased in combination with other parameters (throughflow quantity, temperature, etc.).

Figure 5:
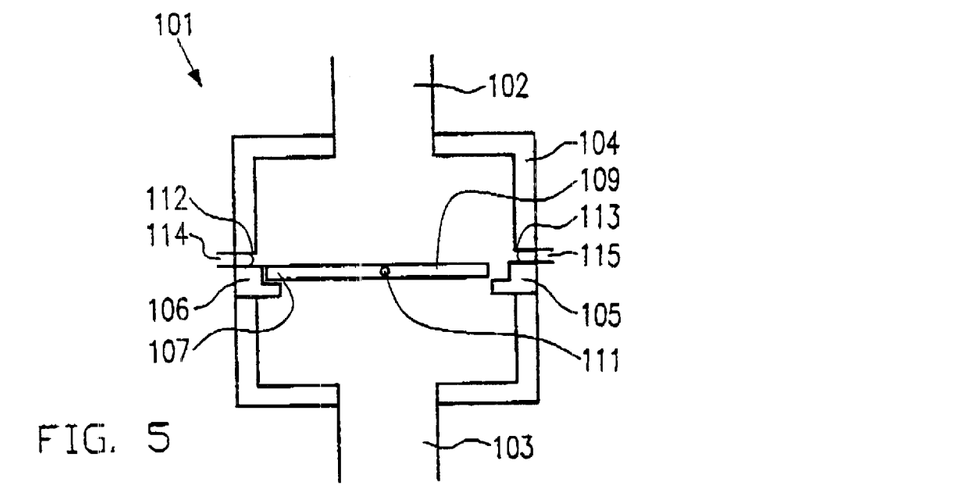

FIG. 5 shows a third embodiment of the present invention. The detection means 101 includes an inlet 102 and an outlet 103. A wall 104 has at each of its diametrically opposed sides a mounting 105 or 106. A periphery 107 of the filter element 109 lies on the mounting 106. Filter element 109 is rigidly connected to a rotatable axis 111. The axis 111 lies at the center of the diameter of the inlet 102. The wall 104 is provided with openings 112 and 113, each of which contains a luminous diode 114 and a photodiode 115, LED 114 and photodiode 115 are so arranged that the photodiode 115, starting from a certain rotation position of the filter element 109, can only receive light emitted from the LED 114 when this light has passed through the filter element 109.

During operation, particles are separated out, as described with reference to the first and second embodiments, at the filter surface. After the stream of milk has been exhausted, the controller sends out a signal and causes the driving element (not shown) to rotate the filter element When a predefined position is reached, the LED 114 will be turned on by the controller and the intensity of the light that passes through the filter element will be measured during the rotation and sent to the controller. When a second predefined rotation position is reached, the LED 114 will be turned off again. From the measured intensity distribution, the controller can determine a threshold value for the actuation of the distributing valve mechanism.

In the above embodiment it is also possible to—instead or additionally—arrange the photodiode 115 so that light will be detected that is reflected from the filter surface. Advantageously the surfaces of the filter element 109 also contain areas with a higher reflectivity that changes depending on the accumulation on the filter and the number of particles and their sizes. The LED can also be replaced by other appropriate radiation sources (laser diodes, light bulbs, IR-LED, microwave emitters), whereby the receiving element 115 is accordingly adapted to the wavelength. Advantageously, the radiation source emits substantially monochromatic rays whose wavelength is so chosen that a interaction between the milk and the emitted rays is as different as possible as that which takes place between the particles and the emitted rays. Preferably the radiation source can, corresponding to the driving of the controller, emit radiation with differing wavelengths by which, for instance, differing LEDs within the emission source can be driven.

Figure 6:
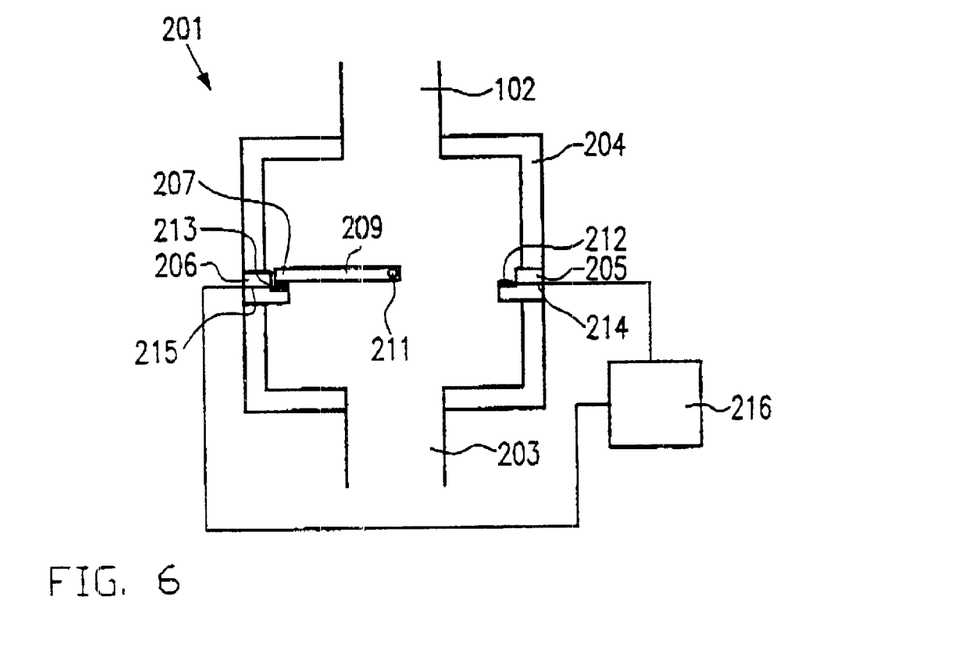

FIG. 6 shows a fourth embodiment of the present invention. A detection means 201 includes an inlet 202 and an outlet 203. A wall 204 has diametrically opposed sides, on each of which is a mounting 205 or 206. A periphery 207 of the filter element 209 lies on the mounting 206. Filter element 209 is rigidly connected to a rotatable axis 211, which simultaneously serves as a border for the filter element. The axis 211 lies at the center of the diameter of the inlet 202. On each of the mountings 205 and 206, piezo elements 212 and 214 are arranged respectively, each being connected electrically, by means of the lines in the feeds 214 and 215, with an oscillatory circuit 216 and the controller.

When in operation, a part of the milk stream strikes the filter surface of the filter element 209 during the suction phase, whereby particle 3 collect on the surface. After the exhausting of the milk stream, the controller sends a signal to the piezo element, which is an electrical component of the oscillatory circuit 216, stimulating it to oscillate. The elgen frequency of the oscillation is dependent on the force or mass as exerted by the filter element on the surface of the piezo element 216 and therefore on the quantity of the particles. From the difference in frequency with respect to a reference measurement, the controller can determine the quantity of particles and thus derive from this a threshold value for the actuation of the distributing valve mechanism. The form of the filter element 209 has been chosen to be asymmetric with respect to the axis 211 in order to achieve a dynamic effect on the piezo element 216 for the particle free state that is as highly different as possible when compared to the particle loaded state of the filter element 209.

In a further embodiment that is not shown, a laser diode and photodiode are so arranged that the emitting radiation, which is emitted by the laser diode parallel and at a defined distance from the surface of the filter element, can be detected by the photodiode. When particles with diameters exceeding the defined distance are deposited, or when particles are deposited upon one another, the photodiode will register this and the controller can accordingly evaluate the signal.

In a further embodiment that is not shown, an ultrasound transmitter and an ultrasound receiver are positioned on a mounting in a measurement area in such a way that by actuating the milk stream, the membranes of the transmitter and receiver are found in the immediate vicinity of the milk stream. Due to the differing ultrasound emissions, different signals are yielded for the milk with particles and for the milk without particles. From the detected signals of the receiver, the controller can calculate the threshold value for the actuation of the distributing valve mechanism. The measurement area can also be so formed that the membrane of the transmitter and receiver are constantly submerged in the milk Advantageously, this can take place in a measurement area that is similar to that previously described above in the first embodiment.

In an advantageous manner, the present invention is combined With the invention as disclosed in DE 196 30 146. One example of this is to, for example, equip the measurement chamber as shown in FIG. 1 in its interior with a radiation source and radiation sensitive sensor (for example LED, photodiode), whereby the particle quantity in the zones inside the chamber that come into contact with the stream can be ascertained by comparing it to the reference measurements of particle free milk or milk containing few particles.

For all of the embodiments that employ a filter element for the measurement a structure has been chosen that allows a measurement of the particle quantity during each suction phase. Through an identical formation of the mountings on which the filter element lies with each 180° rotation, a measurement of the particles is thereby possible at each of the final positions of the filter. However, it is also possible to use only one of the mountings 5 or 6 for cost-saving reasons or for the purpose of having a simpler construction. A measurement can then only be carried out after each second suction phase, since at the around 180° rotated position at which the filter cleaning takes place, the filter is not lying on one of the mountings. Advantageously, reference measurements will be carried out very often, for example, in such a way that the filter element can be thoroughly "rinsed" during several suction phases, in that it is positioned almost parallel to the milk stream in order to subsequently take a measurement on the rinsed filter surface.

The above embodiments have been described as separate devices, however it is possible to combine the different measuring methods in order to achieve a higher dependability. Advantageously, the embodiments which do not use filter elements can be combined with any of those that do.

Further, in the inventive embodiments which employ a filter element for the detection of particles, the rotatable filter element can advantageously be placed in a continuously Interchangeable forwards and reverse rotation during the rinsing process, thereby guaranteeing a very efficient cleaning of the measurement apparatus.

The measurement values that are received for the detection of particles can, of course, not only be drawn for the driving element for the distributing valve mechanism, but also for more complex analyses of the milking process.

In an advantageous embodiment of the invention, the controller can be so programmed that by comparing collected or calculated values (resistance, amount of light, changes in frequency, etc.), it can take into account the time-span profile for milking and, with correspondingly saved functions, determine correction values for the acquired readings.

Advantageously, values which are to serve as norms can also be stored in the controller for the purpose of corrections that, for example, can be ascertained during a rinsing phase after a certain rinse period has run its course and, for instance, that are representative for the milk-free measurement chamber. For the purposes of determining such normal values, especially a normal resistance value, a normal light intensity value, and a normal frequency value, a standard measurement cell block can also be arranged on a suitable, flow-calmed location in the system of lines, particularly when representing a copy of the measurement chamber's measurement geometry of the detection means.

Further to this, the multipath distributing valve mechanism and the detection means can each be provided for each of the teats. The separate monitoring of the milk coming from each teat is practical, since any infections of he udder which can spoil the milk quality can be restricted to only some of the teats.

The data acquisition of sensory characteristics in the milk for the purpose of selecting out milk may actually, when starting from this purpose, serve the general monitoring of the health of the animals in that, through the completed selecting out per se and the analysis of the milk that is selected out, infections, especially those that are already in the preclinical preliminary stages during which the already present infection has not yet caused any external, apparent changes that can be recognized, are diagnosable.

Advantageously the inventive apparatus could be used, in connection with a milk flow measurement device, to determine the quality of particles per unit volume and to thereby carry out a general long-term control of the quality of the milk with reference to the number of particles, independent of the individual fluctuations in the yielded quantity of milk.

Finally, the controller for the driving of the distributing valve mechanism can also process animal-related data, for example in a hers management system, and thereby effect a selecting out of the milk of certain animals independent of the readings.

Furthermore an input element as well as a display apparatus can be provided to input relevant data into the controller, such as, for example, which animal is currently being milked, and in order to make relevant information available to the facility manager. Stored data can also, for example, be wirelessly transmitted via an interface to an external computer device in order to run a further data analysis.

What is claimed is:

1. An apparatus for the automatic selecting out of milk during machine milking comprising:

a measurement apparatus for obtaining sensory characteristics in the milk stream, a distributing valve mechanism with a milk inlet and several milk outlets as well as a seal mechanism for optionally closing the milk outlets and for optionally guiding the milk stream into one of several branch lines, a driving element for actuating the distributing valve mechanism for the selecting out of milk, and a detection means in order to automatically detect particles in the milk stream during the machine milking, whereby the detection means is adapted to detect a feature characteristic of a type of particle, the detection means including a flat filter element with at least one filter area for the filtering out of particles from the milk stream, the filter element including electrically conductive elements that are arranged at a distance and isolated from one another.

2. Apparatus in accordance with claim 1, wherein the detection means comprises an electronic analysis circuit.

3. Apparatus in accordance with claim 1, wherein the detection means comprises a signal transmitter for the transmitting of signals and a signal receiver for the receiving of signals that are transmitted from the signal transmitter.

4. Apparatus according to claim 3, wherein the signal transmitter is an ultrasound transmitter.

5. Apparatus in accordance with claim 1, wherein the detection means comprises an element for clearing the filter element.

6. Apparatus according to claim 1, wherein the filter element is rotatable around an axis.

7. Apparatus according to claim 6, wherein the detection means has a driving element for rotating the filter element.

8. Apparatus according to claim 1, wherein the electrical conductive elements are realized as resistance wires.

9. Apparatus according to claim 1, wherein the filter element comprises a first filter area in which the electrical conductive elements have a first distance from one another and a second filter area in which the electrical conductive elements have a second distance from one another.

10. Apparatus in accordance with claim 1, wherein the detection means comprises a radiation source and a radiation sensitive sensor element.

11. Apparatus according to claim 10, wherein the radiation source and the radiation sensitive sensor element are so arranged that the radiation sensitive sensor element receives the radiation after an interaction with the surface of the filter element has occurred.

12. Apparatus according to claim 10, wherein the radiation source is adapted to emit substantially monochromatic radiation.

13. Apparatus according to claim 10, wherein the radiation source is adapted to transmit radiation substantially parallel to the filter surface during a measurement phase.

14. Apparatus according to claim 1, wherein at least one of the filter areas has a reflective area.

15. An apparatus for the automatic selecting out of milk during machine milking comprising:
a measurement apparatus for obtaining sensory characteristics in the milk stream,
a distributing valve mechanism with a milk inlet and several milk outlets as well as a seal mechanism for optionally closing the milk outlets and for optionally guiding the milk stream into one of several branch lines,
a driving element for actuating the distributing valve mechanism for the selecting out.of milk, and
a detection means in order to automatically detect particles in the milk stream during the machine milking, whereby the detection means is adapted to detect a feature characteristic of a type of particle, the detection means including an ultrasound signal transmitter for the transmitting of signals and a signal receiver for the receiving of signals that are transmitted from the ultrasound signal transmitter, and wherein the ultrasound transmitter and the signal receiver are spatially arranged to be in contact with the milk during the measuring.

16. An apparatus for the automatic selecting out of milk during machine milking comprising:
a measurement apparatus for obtaining sensory characteristics in the milk stream,
a distributing valve mechanism with a milk inlet and several milk outlets as well as a seal mechanism for optionally closing the milk outlets and for optionally guiding the milk stream into one of several branch lines,
a driving element for actuating the distributing valve mechanism for the selecting out of milk, and
a detection means in order to automatically detect particles in the milk stream during the machine milking, whereby the detection means is adapted to detect a feature characteristic of a type of particle, the detection means including a filter element and a microbalance.

17. Apparatus according to claim 16, wherein the microbalance comprises a piezo element and an oscillatory circuit.

18. Apparatus for the automatic selecting out of milk during.machine milking comprising:
a measurement chamber for monitoring sensory features in the milk stream,
a distributing valve mechanism having a milk inlet and several milk outlets as well as a seal mechanism for optionally closing the milk inlets and for optionally guiding the milk stream into one of several branch lines,
a driving element for driving the distributing valve mechanism to select out milk, and
a particle detection means with a filter element that is washed by the milk stream, the filter element including electrical conductive elements arranged at a distance and isolated from one another.

19. Apparatus in accordance with claim 18, wherein the detection means comprises an electronic monitoring circuit.

20. Apparatus in accordance with claim 18, wherein the detection means comprises a signal transmitter for transmitting signals and a signal receiver for receiving signals that are sent by the signal transmitter.

21. Apparatus in accordance to claim 20, wherein the signal transmitter is an ultrasound transmitter.

22. Apparatus in accordance with claim 21, wherein the ultrasound transmitter and the signal receiver are spatially arranged to be in contact with the milk during measurement.

23. Apparatus according to claim 18, wherein the filter element is rotatable around an axis.

24. Apparatus according to claim 23, wherein the detection means comprises a driving element for rotating the filter element.

25. Apparatus according to claim 20, wherein the electrical conductive elements provided as resistant wires.

26. Apparatus according to claim 18, wherein the filter element comprises a first filter area in which the conductive elements have a first distance from one another and a second filter area in which the conductive elements have a second distance from one another.

27. Apparatus according to claim 26, wherein at least one of the filter areas has a reflective area.

28. Apparatus according to claim 18, wherein the detection means comprises a radiation source and a radiation sensitive sensor element.

29. Apparatus according to claim 28, wherein the radiation source and the radiation sensitive sensor element are so arranged that the radiation sensitive sensor element receives the radiation after an interaction with a surface of the filter element has occurred.

30. Apparatus according to claim 28, wherein the radiation source is adapted to emit substantially monochromatic radiation.

31. Apparatus according to claim 28, wherein the radiation source is arranged to transmit radiation substantially parallel to the filter surface during a measurement phase.

32. Apparatus for the automatic selecting out of milk during machine milking comprising:
- a measurement chamber for monitoring sensory features in the milk stream,
- a distributing valve mechanism having a milk inlet and several milk outlets as well as a seal mechanism for optionally closing the milk inlets and for optionally guiding the milk stream into one of several branch lines,
- a driving element for driving the distributing valve mechanism to select out milk, and
- a particle detection means with a filter element that is washed by the milk stream, the detection means including a filter element and a microbalance.

33. Apparatus according to claim 32, wherein the microbalance comprises a piezo element and an oscillating circuit.

\* \* \* \* \*